United States Patent
Matus (10) Patent No.: US 10,257,309 B2
(45) Date of Patent: *Apr. 9, 2019

(54) MOBILE DEVICE-RELATED MEASURES OF AFFINITY

(71) Applicant: Facebook, Inc., Menlo Park, CA (US)

(72) Inventor: Jonathan Arie Matus, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/379,180

(22) Filed: Dec. 14, 2016

(65) Prior Publication Data

US 2017/0091645 A1    Mar. 30, 2017

Related U.S. Application Data

(63) Continuation of application No. 13/632,869, filed on Oct. 1, 2012, now Pat. No. 9,654,591.

(51) Int. Cl.
*G06N 7/00* (2006.01)
*H04L 29/08* (2006.01)
(Continued)

(52) U.S. Cl.
CPC ........... *H04L 67/306* (2013.01); *G06N 7/005* (2013.01); *G06Q 50/01* (2013.01); *H04L 65/403* (2013.01);
(Continued)

(58) Field of Classification Search
CPC ....... H04L 67/306; G06Q 10/10; G06N 7/005
(Continued)

(56) References Cited

U.S. PATENT DOCUMENTS 7,877,346 B2    1/2011  Karty
8,311,948 B1 *  11/2012 Lu ..................... G06Q 50/01
                                              705/319

(Continued)

FOREIGN PATENT DOCUMENTS

CN    102411596 A    4/2012
CN    102609533 A    7/2012
(Continued)

OTHER PUBLICATIONS

Notice of Allowance received from the Korean Patent Office, for Korean Patent Application No. 10-2015-7010372, dated Aug. 4, 2017.

(Continued)

*Primary Examiner* — Ranodhi Serrao
*Assistant Examiner* — James N Fiorillo
(74) *Attorney, Agent, or Firm* — Baker Botts L.L.P.

(57) ABSTRACT

In one embodiment, a method includes sending a request for a measure of affinity associated with a first user for a particular content associated with a second user, where the measure of affinity predicts a level of interest the first user has for the particular content; sending weighting information for computing the measure of affinity, where the weighting information includes information specifying a first weight to be attributed to a first predictor function that is based on the second user and a second weight to be attributed to a second predictor function that is based on concepts associated with the particular content; receiving the measure of affinity; and sending, to the first user, the particular content, based on the received measure of affinity.

20 Claims, 6 Drawing Sheets

(51) Int. Cl.
*H04L 29/06* (2006.01)
*G06Q 50/00* (2012.01)
*H04W 4/50* (2018.01)
*G06F 21/00* (2013.01)
*G06Q 10/10* (2012.01)

(52) U.S. Cl.
CPC .............. *H04L 67/22* (2013.01); *H04W 4/50* (2018.02); *G06F 21/00* (2013.01); *G06Q 10/10* (2013.01)

(58) Field of Classification Search
USPC ................... 709/204, 206; 705/319; 725/10
See application file for complete search history.

(56) References Cited

U.S. PATENT DOCUMENTS

| | | | | |
|---|---|---|---|---|
| 8,700,540 | B1* | 4/2014 | Zambrano | G06Q 50/01 705/319 |
| 8,719,347 | B1* | 5/2014 | Tomkins | G06F 17/30041 709/204 |
| 9,235,571 | B2* | 1/2016 | Gerrity | G06F 3/002 |
| 2009/0030932 | A1* | 1/2009 | Harik | G06F 17/30958 |
| 2009/0124241 | A1* | 5/2009 | Krishnaswamy | G06Q 30/02 455/414.2 |
| 2009/0248494 | A1 | 10/2009 | Hueter et al. | |
| 2010/0306099 | A1* | 12/2010 | Hirson | G06Q 20/10 705/38 |
| 2012/0023169 | A1* | 1/2012 | Kang | H04B 13/005 709/205 |
| 2012/0137367 | A1* | 5/2012 | Dupont | G06F 21/00 726/25 |
| 2012/0166532 | A1* | 6/2012 | Juan | G06Q 30/0224 709/204 |
| 2012/0303714 | A1* | 11/2012 | Chung | G06Q 30/02 709/204 |
| 2013/0005479 | A1* | 1/2013 | McCaffery | A63F 13/10 463/42 |
| 2013/0047104 | A1* | 2/2013 | Chen | G06F 3/0481 715/765 |
| 2013/0051542 | A1* | 2/2013 | Yao | H04M 3/42042 379/142.09 |
| 2013/0054706 | A1* | 2/2013 | Graham | H04M 19/04 709/206 |
| 2013/0073389 | A1* | 3/2013 | Heath | G06Q 30/02 705/14.54 |
| 2013/0111005 | A1* | 5/2013 | Chu | G06N 7/005 709/224 |
| 2013/0165234 | A1* | 6/2013 | Hall | A63F 13/00 463/42 |
| 2013/0179511 | A1* | 7/2013 | Stevens | H04L 67/02 709/204 |
| 2013/0185355 | A1* | 7/2013 | Tseng | H04W 4/21 709/204 |
| 2013/0191455 | A1* | 7/2013 | Penumaka | H04L 67/02 709/204 |
| 2013/0262588 | A1* | 10/2013 | Barak | H04L 67/22 709/204 |
| 2013/0318180 | A1* | 11/2013 | Amin | H04L 65/403 709/206 |
| 2013/0346347 | A1* | 12/2013 | Patterson | G06N 99/005 706/12 |
| 2014/0040366 | A1* | 2/2014 | Brill | H04L 67/306 709/204 |
| 2014/0059576 | A1* | 2/2014 | Mule | G06T 11/80 725/10 |
| 2014/0067931 | A1* | 3/2014 | Hank | H04L 67/306 709/204 |
| 2014/0067953 | A1* | 3/2014 | Weinstein | G06Q 10/10 709/204 |
| 2014/0067967 | A1* | 3/2014 | Jackson | G06Q 50/01 709/206 |
| 2014/0297740 | A1* | 10/2014 | Narayanan | H04L 67/306 709/204 |
| 2016/0080485 | A1* | 3/2016 | Hamedi | H04L 67/02 709/204 |
| 2016/0253710 | A1* | 9/2016 | Publicover | H04W 4/21 705/14.66 |

FOREIGN PATENT DOCUMENTS

| | | |
|---|---|---|
| JP | 2008-107895 A | 5/2008 |
| JP | 2012058986 | 3/2012 |
| JP | 2012-164091 A | 8/2012 |
| JP | 2012-164092 A | 8/2012 |
| KR | 20120003362 A | 1/2012 |
| KR | 20120101272 A | 9/2012 |
| TW | 200720946 A | 6/2007 |
| WO | WO 2011099688 A1 | 8/2011 |

OTHER PUBLICATIONS

Examination Report No. 2 received from the Australian Patent Office, for Australian Patent Application No. 2013327720, dated Jun. 13, 2017.
Taiwan Office Action received from the Taiwan Patent Office, for Taiwan Patent Application No. 102135055, dated Aug. 15, 2017.
Examination Report No. 1 received from the Australian IP Government, for Australian Patent Application No. 2017228704, dated Dec. 22, 2017.
Australian Office Action received from the Australian IP Government, for Australian Patent Application No. 2013327720, dated Sep. 13, 2017.
Notification of Reasons for Rejection received from the JPO, for Japanese Patent Application No. 2017-078682, dated Apr. 24, 2018.
Examination report received from the Australian IP Government for Australian Patent Application No. 2017228704, dated May 31, 2018.
TW Office Action for Patent Application No. 106144914. (with English Translation), dated Jun. 27, 2018.
AU Office Action received for Patent Application No. 2017228704, dated Sep. 21, 2018.
CA Office Action received for Patent Application No. 2,951,414, dated Oct. 15, 2018.
AU Office Action received for Patent Application No. 2017228704, dated Jan. 9, 2019.
KR Office Action received from KIPO for Patent Application No. 10-2017-7032102. (with English Translation), dated Jan. 30, 2019.

* cited by examiner

MOBILE DEVICE-RELATED MEASURES OF AFFINITY

PRIORITY

This application is a continuation under 35 U.S.C. § 120 of U.S. patent application Ser. No. 13/632,869, filed 1 Oct. 2012.

TECHNICAL FIELD

This disclosure generally relates to mobile devices, and more particularly, to determining measures of affinity based on usage of a mobile device.

BACKGROUND

Mobile computing and communication devices, such as cellphones, personal; digital assistants (PDAs), tablet computers, and mini-laptops have become prevalent in recent years. Such mobile devices are often tied to a specific individual and therefore contain personal information, including account information, user profile information, or information associated with other users. In addition, mobile devices may have Internet-connected applications providing interactions with content items or other users.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1:
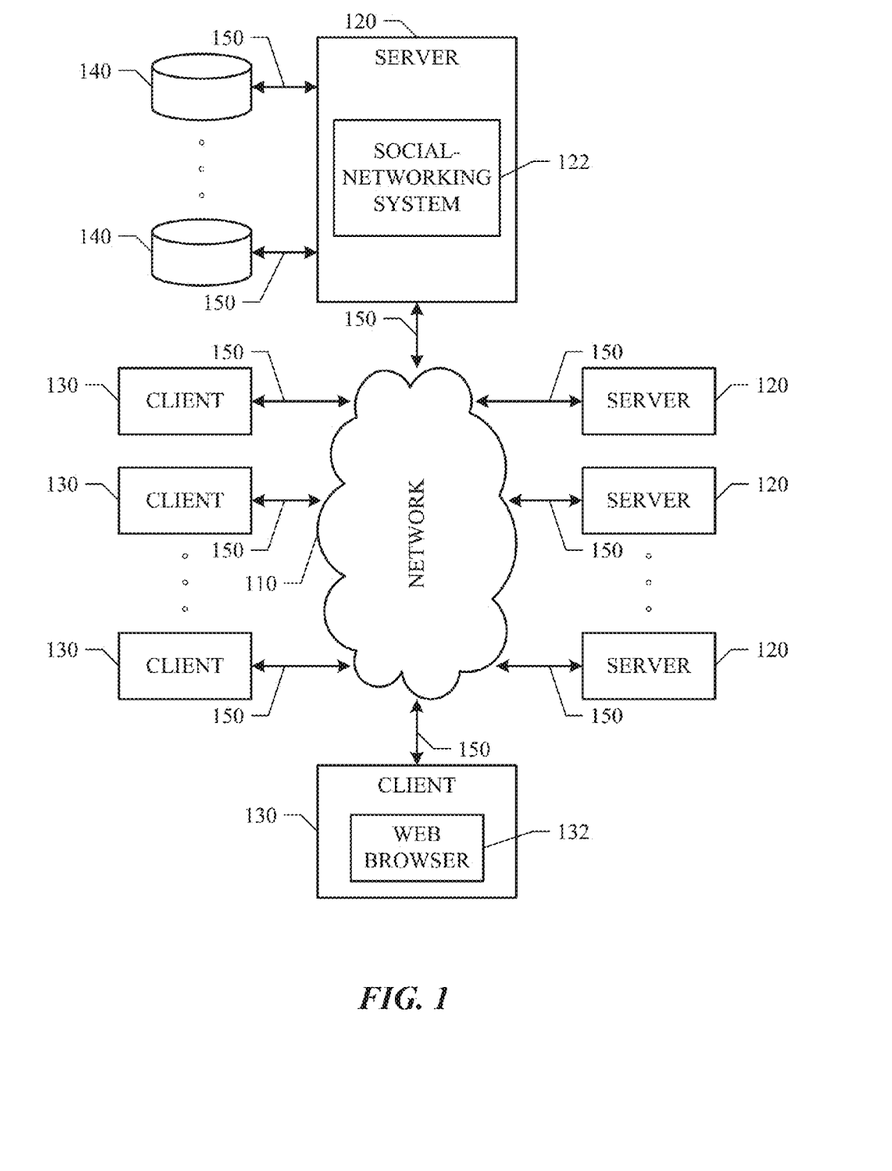
FIG. 1 illustrates an example network environment.

FIG. 1 illustrates an example network environment 100. Network environment 100 includes a network 110 coupling one or more servers 120 and one or more clients 130 to each other. In particular embodiments, network 110 is an intranet, an extranet, a virtual private network (VPN), a local area network (LAN), a wireless LAN (WLAN), a wide area network (WAN), a metropolitan area network (MAN), a portion of the Internet, a cellular technology-based network, a satellite communications technology-based network, or another network 110 or a combination of two or more such networks 110. This disclosure contemplates any suitable network 110.

One or more links 150 couple a server 120 or a client 130 to network 110. In particular embodiments, one or more links 150 each includes one or more wireline, wireless, or optical links 150. In particular embodiments, one or more links 150 each includes an intranet, an extranet, a VPN, a LAN, a WLAN, a WAN, a MAN, a portion of the Internet, a cellular technology-based network, a satellite communications technology-based network, or another link 150 or a combination of two or more such links 150. This disclosure contemplates any suitable links 150 coupling servers 120 and clients 130 to network 110.

In particular embodiments, each server 120 may be a unitary server or a distributed server spanning multiple computers or multiple datacenters. Servers 120 may be of various types, such as, for example and without limitation, web server, news server, mail server, message server, advertising server, file server, application server, exchange server, database server, proxy server, another server suitable for performing functions and/or processes described herein, or any combination thereof. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host hypertext markup language (HTML) files or other file types, or may dynamically create or constitute files upon a request, and communicate them to clients 130 in response to hypertext transfer protocol (HTTP) or other requests from clients 130. A mail server is generally capable of providing electronic mail services to various clients 130. A database server is generally capable of providing an interface for managing data stored in one or more data stores. In particular embodiments, a social-networking system 122 may be hosted on a server 120. Although this disclosure describes and illustrates a particular social-networking system having a particular configuration of particular components, this disclosure contemplates a social-networking system having any suitable configuration of any suitable components.

In particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. In particular embodiments, each data storage 140 may be a relational database. Particular embodiments may provide interfaces that enable servers 120 or clients 130 to manage, e.g., retrieve, modify, add, or delete, the information stored in data storage 140.

Social-networking system 122 may include a number of components (i.e. data storage 140) used to store information about its users and objects represented in the social networking environment, as well as the relationships among the users and objects. Social-networking system 122 may additionally include components to enable several actions to user devices of the social-networking system, as described below. Social graph 140 stores the connections that each user has with other users of the social-networking system 122. In particular embodiments, social graph 140 may also store second-order connections. The connections may thus be direct or indirect. For example, if user A is a first-order connection of user B but not of user C, and B is a first-order connection of C, then C is a second-order connection of A on the social graph. Action store 140 stores actions that have been performed by the users of the social-networking system 122, along with an indication of the time associated with those actions and references to any objects related to the actions. Additionally, action store 140 may store statistics for specified categories of actions. The actions recorded in action store 140 may be farmed actions, which are performed by a user in response to the social-networking system 122 providing suggested choices of actions to the user.

A predictor module is responsible for computing a set of predictor functions that predict whether a user will perform a set of corresponding actions. As discussed below, each predictor function may be representative of a user's interest in a particular action associated with the predictor function. The authentication manager authenticates a user on client device 130 as being a registered user of social-networking system 122. The authentication manager may allow a user to log into the social-networking system from any client device 130 that has an application supporting the social-networking system 122. The API works in conjunction with the authentication manager to validate users via the external applications. An affinity module provides a measure of affinity or relevance for a particular action derived from a combination of predictor functions for other actions. Various processes may request a measure of affinity from the affinity module. As an example and not by way of limitation, the processes may include social-networking system 122 functionality, such as for example newsfeed algorithms, advertising-targeting algorithms, or friend-suggestion algorithms. Other processes that request measures of affinity may be executed by one or more platform applications, which are applications that operate within social-networking system 122 but may be provided by third parties other than an operator of the social-networking system 122 platform applications may include social games, messaging services, or any suitable application that uses the social platform provided by social-networking system 122. Determination and use of measures of affinity are discussed in further detail in the following U.S. patent applications: U.S. patent application Ser. No. 11/502,757, filed on 11 Aug. 2006, titled "Generating a Feed of Stories Personalized for Members of a Social Network," and issued as U.S. Pat. No. 7,827,208; U.S. patent application Ser. No. 12/645,481, filed on 23 Dec. 2009, titled "Selection and Presentation of Related Social Networking System Content and Advertisements;" U.S. patent application Ser. No. 13/247,825, filed on 28 Sep. 2011, titled "Instantaneous Recommendation of Social Interactions in a Social Networking System;" U.S. patent application Ser. No. 12/976,755, filed on 22 Dec. 2010, titled "Pricing Relevant Notifications Provided to a User Based on Location and Social Information;" and U.S. patent application Ser. No. 12/978,265, filed on 23 Dec. 2010, titled "Contextually Relevant Affinity Prediction in a Social Networking System," all of which are incorporated herein by reference.

In some embodiments, the processes requesting a measure of affinity for a user may include one or more external applications running on an external server 120. The external applications may interact with social-networking system 122 via an API. The external applications can perform various operations supported by the API, such as enabling users to send each other messages through the social-networking system or showing advertisements routed through the social networking system 122. The authentication manager of social-networking system 122 authenticates a user on client device 130 as being a registered user of the social-networking system 122. The authentication manager may allow a user to log into the social-networking system 122 from any client device 130 that has an application supporting social-networking system 122.

The social-networking system 122 may encourage users to participate more actively, including by interacting with other users. There are many contexts in which the social-networking system 122 may wish to know the interests of a particular user. Generally, social-networking system 122 would like to be able to make a decision about what will be most interesting to a user so that social networking system 122 can present options to the user that are likely to cause the user to take actions in social-networking system 122. For example, the social-networking system 122 may want to know what is interesting to a user when deciding what content or stories to put in the newsfeed, what advertisements a user is likely to "click through" when selecting advertisements to serve, or which applications a user is likely to use when suggesting an application to the user. Social-networking system 122 allows users to associate themselves and establish connections with other users of social-networking system 122. When two users become connected, they are said to be "connections," "friends," "contacts," or "associates" within the context of social-networking system 122. Generally being connected to social-networking system 122 allows connected users access to more information about each other than would otherwise be available to unconnected users. Likewise, becoming connected within social-networking system 122 may allow a user greater access to communicate with another user, such as by e-mail (internal and external to the social-networking system), instant message, text message, phone, or any other communication interface. Finally, being connected may allow a user access to view, comment on, download or endorse another user's uploaded content items. Examples of content items include but are not limited to messages, queued messages (e.g., email), text and SMS (short-message service) messages, comment messages, messages sent using any other suitable messaging technique, an HTTP link, HTML files, images, videos, audio clips, documents, document edits, calendar entries or events, and other computer-related files.

In particular embodiments, each client 130 may be an electronic device including hardware, software, or embedded logic components or a combination of two or more such components and capable of carrying out the appropriate functionalities implemented or supported by client 130. For example and without limitation, a client 130 may comprise a computer system such as: a desktop computer, a notebook or laptop, a netbook, a tablet, an e-book reader, a global positioning system (GPS) device, a camera, a personal digital assistant (PDA), a handheld electronic device, a mobile telephone, or another similar processor-based electronic device. This disclosure contemplates any suitable clients 130. A client 130 may enable a network user at client 130 to access network 110. A client 130 may enable its user to communicate with other users at other clients 130. In particular embodiments, a client device 130 may comprise a mobile computing device 200 as described in FIGS. 2A and 2B.

A client 130 may have a web browser 132, such as MICROSOFT INTERNET EXPLORER, GOOGLE CHROME or MOZILLA FIREFOX, and may have one or more add-ons, plug-ins, or other extensions, such as TOOL- BAR or YAHOO TOOLBAR. A user at client 130 may enter a Uniform Resource Locator (URL) or other address directing the web browser 132 to a server 120, and the web browser 132 may generate a HTTP request and communicate the HTTP request to server 120. Server 120 may accept the HTTP request and communicate to client 130 one or more HTML files responsive to the HTTP request. Client 130 may render a web page based on the HTML files from server 120 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 2A:
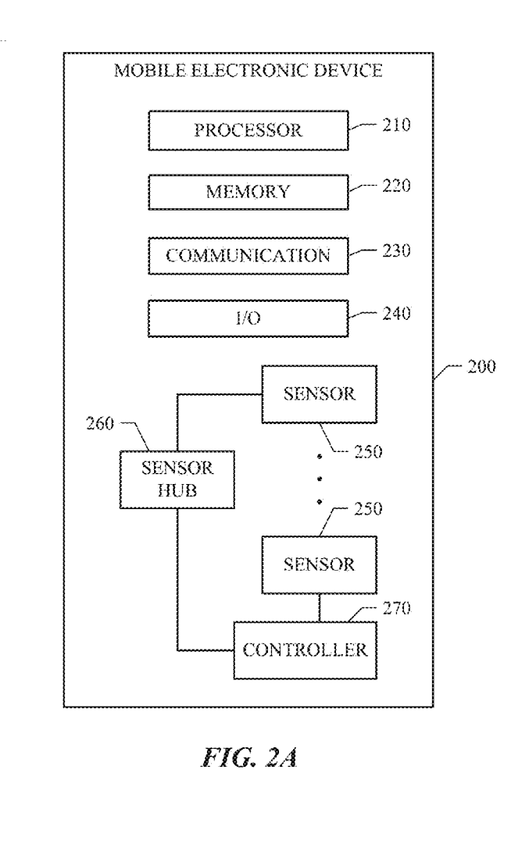
FIG. 2A illustrates an example mobile-computing device.

FIG. 2A illustrates an example mobile-computing device 200. In particular embodiments, mobile-computing device 200 may comprise a processor 210, a memory 220, a communication component 230 (e.g., antenna and communication interface for wireless communications), one or more input and/or output (I/O) components and/or interfaces 240, and one or more sensors 250. In particular embodiments, one or more I/O components and/or interfaces 240 may incorporate one or more sensors 250. In particular embodiments, mobile computing device 200 may comprise a computer system or and element thereof as described in FIG. 6 and associated description.

In particular embodiments, a mobile-computing device 200, may include various types of sensors 250, such as, for example and without limitation: touch sensors (disposed, for example, on a display of the device, the back of the device and/or one or more lateral edges of the device) for detecting a user touching the surface of the mobile computing device 200 (e.g., using one or more fingers); accelerometer for detecting whether the mobile-computing device 200 is moving and the speed of the movement; thermometer for measuring the temperature change near mobile-computing device 200; proximity sensor for detecting the proximity of mobile-computing device 200 to another object (e.g., a hand, desk, or other object); light sensor for measuring the ambient light around mobile computing device 200; imaging sensor (e.g., camera) for capturing digital still images and/or video of objects near the personal computing device 200 (e.g., scenes, people, bar codes, QR codes, etc.); location sensors (e.g. GPS) for determining the location (e.g., in terms of latitude and longitude) of the mobile electronic device; sensors for detecting communication networks within close proximity (e.g., near-field communication (NFC), Bluetooth, RFID, infrared); chemical sensors; biometric sensors for biometrics-based (e.g., fingerprint, palm vein pattern, hand geometry, iris/retina, DNA, face, voice, olfactory) authentication of user of mobile-computing device 200, etc. This disclosure contemplates a mobile electronic device including any applicable type of sensor.

In particular embodiments, a sensors hub 260 may optionally be included in mobile-computing device 200. Sensors 250 may be connected to sensors hub 260, which may be a low power-consuming processor that controls sensors 250, manages power for sensors 250, processes sensor inputs, aggregates sensor data, and performs certain sensor functions. In addition, in particular embodiments, some types of sensors 250 may be connected to a controller 270. In this case, sensors hub 260 may be connected to controller 270, which in turn is connected to sensor 250. Alternatively, in particular embodiments, there may be a sensor monitor in place of sensors hub 260 for managing sensors 250.

In particular embodiments, in addition to the front side, personal computing device 200 may have one or more sensors for performing biometric identification. Such sensors may be positioned on any surface of mobile-computing device 200. In example embodiments, as the user's hand touches mobile-computing device 200 to grab hold of it, the touch sensors may capture the user's fingerprints or palm-vein pattern. In example embodiments, while a user is viewing the display of mobile-computing device 200, a camera may capture an image of the user's face to perform facial recognition. In example embodiments, while a user is viewing the display of mobile-computing device 200, an infrared scanner may scan the user's iris and/or retina. In example embodiments, while a user is in contact or close proximity with mobile-computing device 200, chemical and/or olfactory sensors may capture relevant data about a user. In particular embodiments, upon detecting that there is a change in state with respect to the identity of the user utilizing mobile-computing device 200, either by itself or in combination with other types of sensor indications, mobile-computing device 200 may determine that it is being shared.

In particular embodiments, in addition to the front side, mobile-computing device 200 may have touch sensors on the left and right sides. Optionally, the mobile-computing device 200 may also have touch sensors on the back, top, or bottom side. Thus, as the user's hand touches mobile-computing device 200 to grab hold of it, the touch sensors may detect the user's fingers or palm touching mobile-computing device 200. In particular embodiments, upon detecting that there is a change in state with respect to a user touching mobile-computing device 200, either by itself or in combination with other types of sensor indications, mobile computing device 200 may determine that it is being shared.

In particular embodiments, mobile-computing device 200 may have an accelerometer in addition to or instead of the touch sensors on the left and right sides. Sensor data provided by the accelerometer may also be used to estimate whether a new user has picked up mobile-computing device 200 from a resting position, e.g., on a table or desk, display shelf, or from someone's hand or from within someone's bag. When the user picks up mobile computing device 200 and brings it in front of the user's face, there may be a relatively sudden increase in the movement speed of personal computing device 200. This change in the mobile-computing device's 200 speed may be detected based on the sensor data supplied by the accelerometer. In particular embodiments, upon detecting that there is a significant increase in the speed of the mobile device's 200, either by itself or in combination with other types of sensor indications, mobile-computing device 200 may determine that it is being shared.

In particular embodiments, mobile computing device 200 may have a gyrometer in addition or instead of the touch sensors on the left and right sides. A gyrometer, also known as a gyroscope, is a device for measuring the orientation along one or more axis. In particular embodiments, a gyrometer may be used to measure the orientation of mobile-computing device 200. When mobile-computing device 200 is stored on a shelf or in the user's bag, it may stay mostly in one orientation. However, when the user grabs hold of mobile computing device 200 and lifts it up and/or moves it closer to bring it in front of the user's face, there may be a relatively sudden change in the orientation of mobile-computing device 200. The orientation of mobile-computing device 200 may be detected and measured by the gyrometer. If the orientation of mobile-computing device 200 has changed significantly, In particular embodiments, upon detecting that there is a significant change in the orientation of mobile-computing device 200, either by itself or in combination with other types of sensor indications, mobile-computing device 200 may determine that it is being shared.

In particular embodiments, mobile computing device 200 may have a light sensor. When mobile-computing device 200 is stored in a user's pocket or case, it is relatively dark around mobile-computing device 200. On the other hand, when the user brings mobile-computing device 200 out of his pocket, it may be relatively bright around mobile-computing device 200, especially during day time or in well-lit areas. The sensor data supplied by the light sensor may be analyzed to detect when a significant change in the ambient light level around mobile-computing device 200 occurs. In particular embodiments, upon detecting that there is a significant increase in the ambient light level around mobile-computing device 200, either by itself or in combination with other types of sensor indications, mobile-computing device 200 may determine that it is being shared.

In particular embodiments, mobile-computing device 200 may have a proximity sensor. The sensor data supplied by the proximity sensor may be analyzed to detect when mobile-computing device 200 is in close proximity to a specific object, such as the user's hand. For example, mobile-computing device 200 may have an infrared light-emitting diode (LED) 290 (i.e., proximity sensor) placed on its back side. When the user holds such a mobile device in his hand, the palm of the user's hand may cover infrared LED 290. As a result, infrared LED 290 may detect when the user's hand is in close proximity to mobile-computing device 200. In particular embodiments, upon detecting that mobile-computing device 200 is in close proximity to the user's hand, either by itself or in combination with other types of sensor indications, mobile-computing device 200 may determine that it is being shared.

A mobile-computing device 200 may have any number of sensors of various types, and these sensors may supply different types of sensor data. Different combinations of the individual types of sensor data may be used together to detect and estimate a user's current intention with respect to mobile-computing device 200 (e.g., whether the user really means to take mobile-computing device 200 out of his pocket and use it). Sometimes, using multiple types of sensor data in combination may yield a more accurate, and thus better, estimation of the user's intention with respect to mobile-computing device 200 at a given time than only using a single type of sensor data. Nevertheless, it is possible to estimate the user's intention using a single type of sensor data (e.g., touch-sensor data).

Figure 2B:
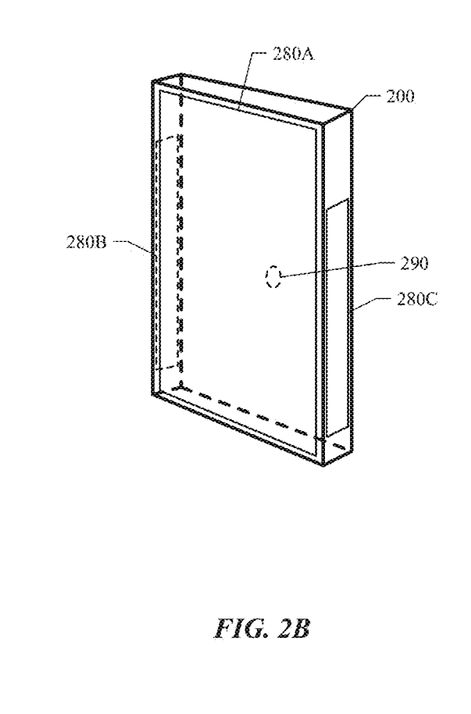
FIG. 2B illustrates the exterior of an example mobile computing device.

FIG. 2B illustrates the exterior of an example mobile computing device 200. mobile-computing device 200 has approximately six sides: front, back, top, bottom, left, and right. Touch sensors may be placed anywhere on any of the six sides of mobile-computing device 200. In the example of FIG. 2B, a touch screen incorporating touch sensors 280A is placed on the front of mobile-computing device 200. The touch screen may function as an input/output (I/O) component for mobile-computing device 200. In addition, touch sensors 280B and 280C are placed on the left and right sides of mobile-computing device 200, respectively. Touch sensors 280B and 280C may detect a user's hand touching the sides of mobile-computing device 200. In particular embodiments, touch sensors 280A, 280B, 280C may be implemented using resistive, capacitive, and/or inductive touch sensors. The electrodes of the touch sensors 280A, 280B, 280C may be arranged on a thin solid piece of material or a thin wire mesh. In the case of capacitive touch sensors, there may be two types of electrodes: transmitting and receiving. These electrodes may be connected to a controller (e.g., controller 270 illustrated in FIG. 2A), which may be a microchip designed to drive the transmitting electrodes with electrical pulses and measure the changes in capacitance from the receiving electrodes caused by a touch input in order to detect the locations of the touch input.

Mobile-computing device 200 is merely an example. In practice, a device may have any number of sides, and this disclosure contemplates devices with any number of sides. The touch sensors may be placed on any side of a device.

In particular embodiments, mobile-computing device 200 may have a proximity sensor 290 (e.g., an infrared LED) placed on its back side. Proximity sensor 290 may be able to supply sensor data for determining its proximity, and thus the proximity of mobile-computing device 200, to another object.

Figure 3:
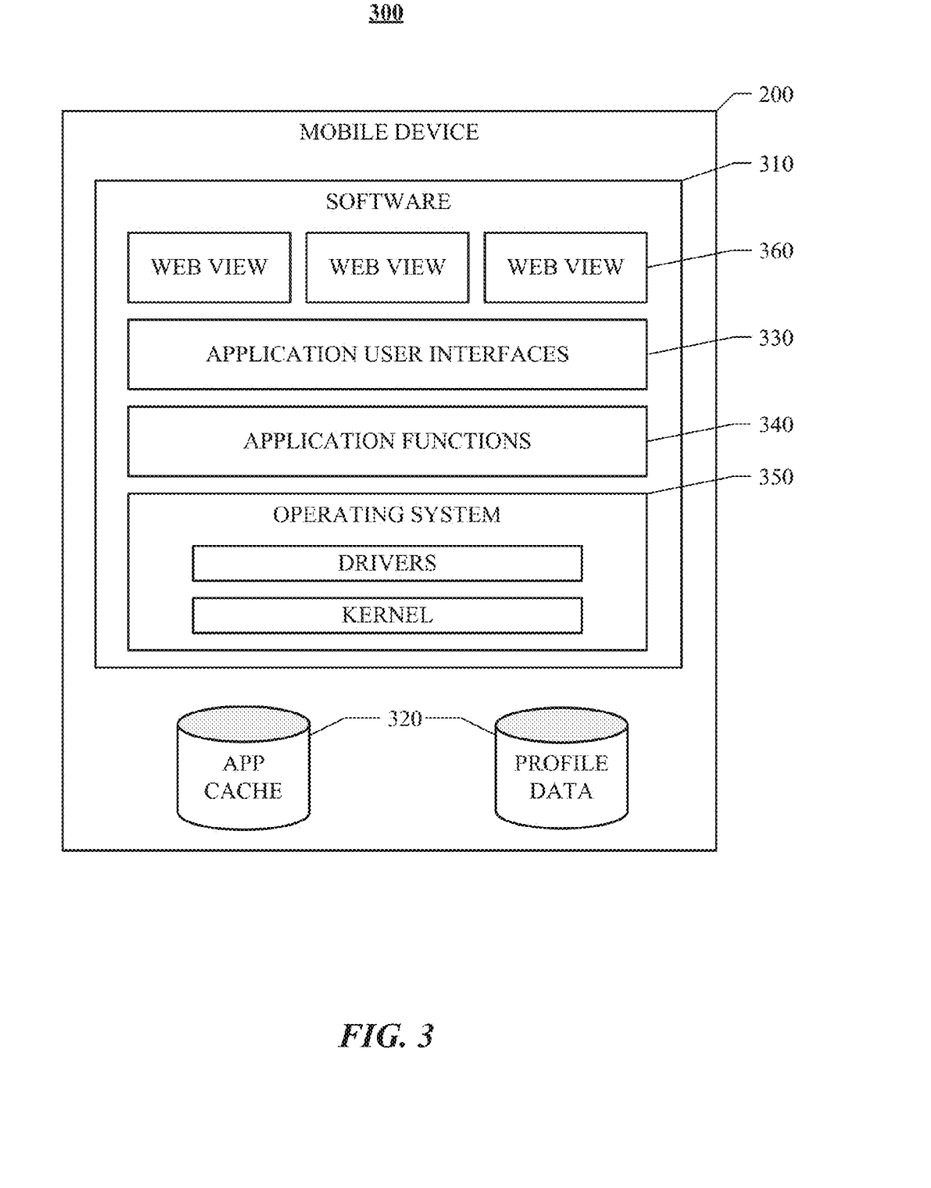
FIG. 3 illustrates an example software architecture for information and applications on an example mobile-computing device.

FIG. 3 illustrates an example software architecture 300 for information and applications on an example mobile-computing device 200. In particular embodiments, software architecture 300 may comprise software 310 and data store(s) 320. In particular embodiments, personal information may be stored in an application data cache 320 and/or a profile data store 320 and/or another data store 320. In particular embodiments, one or more software applications may be executed on mobile-computing device 200. In particular embodiments, they may be web-based applications hosted on servers. For example, a web-based application may be associated with a URI (Uniform Resource Identifier) or URL. From personal computing device 200, a user may access the web-based application through its associated URI or URL (e.g., by using a web browser). Alternatively, in other embodiments, they may be native applications installed and residing on mobile-computing device 200. Thus, software 310 may also include any number of application user interfaces 330 and application functions 340. For example, one application (e.g., GOOGLE MAPS) may enable a device user to view a map, search for addresses and businesses, and get directions; a second application may enable the device user to read, send, and receive emails; a third application (e.g., a web browser) may enable the mobile-computing device 200 user to browse and search the Internet; a fourth application may enable the device user to take photos or record videos using mobile-computing device 200; a fifth application may allow the device user to receive and initiate voice-over Internet protocol (VoIP) and/or cellular network calls, and so on. Each application has one or more specific functionalities, and the software (e.g., one or more software modules) implementing these functionalities may be included in application functions 340. Each application may also have a user interface that enables the device user to interact with the application, and the software implementing the application user interface may be included in application user interfaces 330. In particular embodiments, the functionalities of an application may be implemented using JAVASCRIPT, JAVA, C, or other suitable programming languages. In particular embodiments, the user interface of an application may be implemented using HTML, JAVASCRIPT, JAVA, or other suitable programming languages.

In particular embodiments, the user interface of an application may include any number of screens or displays. In particular embodiments, each screen or display of the user interface may be implemented as a web page. Thus, the device user may interact with the application through a series of screens or displays (i.e., a series of web pages). In particular embodiments, operating system 350 is ANDROID mobile technology platform. With ANDROID, there is a JAVA package called "android.webkit", which provides various tools for browsing the web. Among the "android.webkit" package, there is a JAVA class called "android.webkit.WebView", which implements a view for displaying web pages. This class uses the WebKit rendering engine to display web pages and includes methods to navigate forward and backward through a history, zoom in, zoom out, perform text searches, and so on. In particular embodiments, an application user interface 330 may utilize ANDROID's WebView application programming interface (API) to display each web page of the user interface in a view implemented by the "android.webkit.WebView" class. Thus, in particular embodiments, software 310 may include any number of web views 360, each for displaying one or more web pages that implement the user interface of an application.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, a web view 360 or application user interfaces 330. Each input event may be forwarded to application functions 340, or application functions 340 may listen for input events thus generated. When application functions 340 receive an input event, the appropriate software module in application functions 340 may be invoked to process the event. In addition, specific functionalities provided by operating system 350 and/or hardware (e.g., as described in FIGS. 1 and 2A-B) may also be invoked. For example, if the event is generated as a result of the user pushing a button to take a photo with mobile-computing device 200, a corresponding image processing module may be invoked to convert the raw image data into an image file (e.g., JPG or GIF) and store the image file in the storage 320 of mobile-computing device 200. As anther example, if the event is generated as a result of the user selecting an icon to compose an instant message, the corresponding short-message service (SMS) module may be invoked to enable the user to compose and send the message.

In particular embodiments, when an output of the application is ready to be presented to the user, an event (e.g., an output event) may be generated by, for example, a software module in application functions 340 or operating system 350. Each output event may be forwarded to application user interfaces 330, or application user interfaces 330 may listen for output events thus generated. When application user interfaces 330 receive an output event, it may construct a web view 360 to display a web page representing or containing the output. For example, in response to the user selecting an icon to compose an instant message, an output may be constructed that includes a text field that allows the user to input the message. This output may be presented to the user as a web page and displayed to the user in a web view 360 so that the user may type into the text field the message to be sent.

The user interface of an application may be implemented using a suitable programming language (e.g., HTML, JAVASCRIPT, or JAVA). More specifically, in particular embodiments, each web page that implements a screen or display of the user interface may be implemented using a suitable programming language. In particular embodiments, when a web view 360 is constructed to display a web page (e.g., by application user interfaces 330 in response to an output event), the code implementing the web page is loaded into web view 360.

Figure 4:
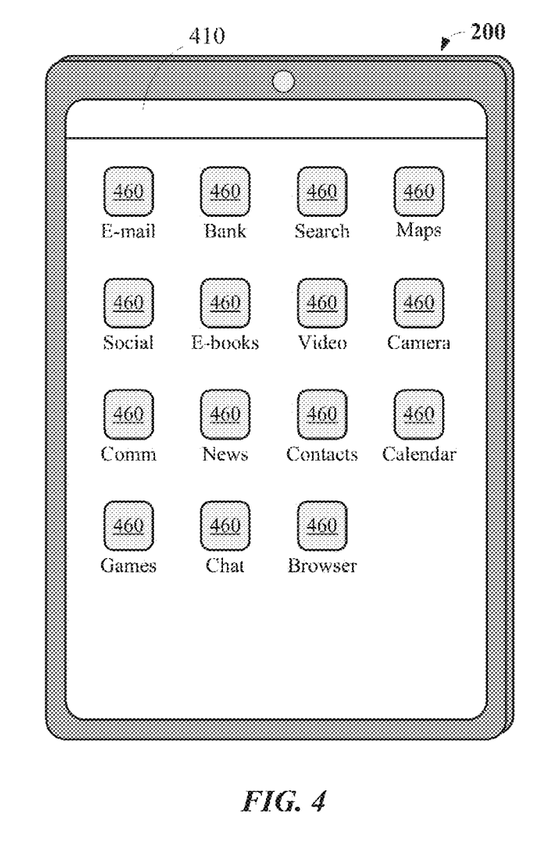
FIG. 4 illustrates an example wireframe of an example home screen of an example mobile-computing device.

FIG. 4 illustrates an example wireframe of an example home screen 410 of an example mobile-computing device 200. In the example of FIG. 4, the example home screen 410 displays one or more icons 460 that each correspond to a particular application that may be executed on mobile-computing device 200. As described above, a touch input on an icon 460 may launch applications that may perform a function of mobile-computing device 200 or interact with other users or access content through a network connection. As an example and not by way of limitation, applications may enable a user to view a map ("Maps"), search for information ("Search"), read, send, or receive e-mail ("E-mail"), browse the Internet ("Browser"), play a game ("Game"), make communicate with another user through VoIP connection or other protocol ("Comm"), or take photos or record videos ("Camera"). Applications, such as for example, "Contacts", "Comm", or "Calendar" may store data of the user of mobile-computing device 200 or data associated with other users. In particular embodiments, one or more of the applications may provide interaction with a user of another mobile-computing device.

In particular embodiments, applications associated with a subset of icons 460 may store data associated with other users. As an example and not by way of limitation, applications "Contacts", "E-mail", "Calendar", "Comm", or "Games" may store data associated with other users, such as for example user identification information on an online game, e-mail address, telephone number, or physical address. In particular embodiments, one or more applications may store data associated with users who are part of the social graph of the user of mobile-computing device 200. In particular embodiments, one or more application may store data associated with users who are not part of the social graph of the user of mobile-computing device 200.

The social-networking system maintains a profile for each user with historical data that may provide input to one or more predictor functions. The predictor functions may predict whether a user will perform a particular action based on the user's interest in the action. Actions performed by a particular user on mobile-computing device 200 may be maintained in a database or other data repository, such as for example the action store of the social-networking system. In particular embodiments, at least part of the history of the user's actions on mobile-computing device 200 may include actions not taken in relation to the social-networking system. Actions taken using mobile-computing device 200 may be correlated with data stored in mobile-computing device 200 and the data and information about the actions transmitted to and stored on the social-networking system. As an example and not by way of limitation, the number of telephone calls made using mobile-computing device 200 to a particular user may be correlated with other contact information (e.g. physical address) associated with the telephone numbers stored on mobile-computing device 200.

The history of the user's actions on mobile-computing device 200 may be used as a signal of a user's future interest in the same actions. In some embodiments, the predictor function is generated using a machine-learning algorithm that is trained using the history of the user's actions on mobile-computing device 200 associated with an action. As discussed above, the predictor module provides a predictor function for each of a set of actions, where a predictor function may take as an input the history of the user's actions and then output a measure of the likelihood that the user will engage in the corresponding action(s). In particular embodiments, actions on mobile-computing device 200 may include, for example, actions using the telephone features of mobile-computing device 200, actions regarding accessing content through a network connection, actions regarding contact information stored on mobile-computing device 200, or actions regarding applications on mobile-computing device 200. As an example and not by way of limitation, actions using the telephone features include making a telephone call, receiving a telephone call, declining a telephone call, sending a telephone call directly to voicemail, listening to a voicemail, deleting a voicemail without listening to it, blocking telephone calls from a particular telephone number, or restricting telephone calls to certain types of telephone numbers. As another example, actions regarding accessing content through a network connection may include sending content, receiving content, declining content, indicating that received content is spam, commenting on a content item, or blocking content from a particular sender. As another example, actions regarding contact information stored on mobile-computing device 200 may include adding the telephone number for a received telephone call to a list of contacts, deleting an entry from the list of contacts, or searching through the list of contacts. As another example, actions regarding applications on mobile-computing device 200 may include installing an application on mobile-computing device 200, deleting an application, using an application, inviting a connection to perform an action through an application, or playing a game. The actions described above and other suitable interactions within the context of use of mobile-computing device 200 may be recorded by social-networking system and used to generate device-related measures of affinity which predict the relevance of particular content to the user of mobile-computing device 200. Particular actions taken using the mobile-computing device 200 may have additional information that may be used as part of the input to a predictor function. As an example and not by way of limitation, a property associated with an action on mobile-computing device 200 may include a duration of time associated with the action, a frequency with which the action is performed, or other statistics associated with the action.

In some embodiments, one or more of the predictor functions may use a decay factor in which the strength of the signal from the history of the user's actions on mobile-computing device 200 decays with time. Moreover, different predictor functions may decay the history of the user's actions on mobile-computing device 200 at different rates. Therefore, the predictor functions may decay the effect of the history of the user's actions on mobile-computing device 200 based on an understanding about how those actions may become less relevant over the passage of time. Various decay mechanisms may be used for this purpose. As an example and not by way of limitation, a predictor function may be implemented as a ratio of two affine functions with numerator and denominator affine functions that use statistics of the history of the user's actions as inputs. The denominator affine function can represent a normalization of the numerator affine function. For example, the number of telephone calls made by a user to a particular person may be normalized by, among other statistics, the number of times the user used the telephone functionality of mobile-computing device 200.

The predictor functions may predict any number of actions or activities on mobile-computing device 200, which may be within or outside of the social-networking system. For example, actions or activities predicted by the predictor functions may include various types of a user's communications through mobile-computing device 200, such as messages, posting of content, and commenting on content; various types of a user's observation actions, such as viewing profiles of other connections and viewing photos and content posted by other connections; and various types of coincidence information about two or more users, such as being tagged in the same photograph, checked in at the same location, and attending the same event. A predictor function may be determined using a machine-learning algorithms trained on the history of the user's actions on mobile-computing device 200 and past user responses or data farmed from users by exposing them to various options and measuring responses.

In particular embodiments, the social graph of the user on the social-networking system may be modified in response to information obtained from data stored or actions taken on mobile computing device 200. As an example and not by way of limitation, contact information stored on mobile computing device 200 may include contact information of another user who is not associated with the social graph of the user. The social-networking system may modify the social graph of the user by adding a new node for the non-member user in response to receiving the contact information the non-member user from mobile computing device 200. As another example, the social-networking system may modify the social graph of the user by creating an edge in the social graph between the user of the social networking system and the non-member user. In particular embodiments, additional information associated with the actions on mobile-computing device 200 may be added to a node or edge of the social graph. As an example and not by of limitation, a frequency of telephone calls between the user and another user may be added to the edge connecting the user and the other user.

A process running in the social-networking system requests a measure of affinity for a particular user from the affinity module of the social-networking system that implements an affinity function. Various processes may request a measure of affinity from the affinity module. For example, the processes may include those that implement social-networking functionality, such as for example, newsfeed algorithms, advertisement-targeting algorithms, or friend-suggestion algorithms. Other processes that request measures of affinity may be executed by one or more platform applications, which are applications that operate within the social-networking system but may be provided by third parties other than an operator of the social-networking system. Platform applications may include social games, messaging services, and any other application that uses the social platform provided by the social-networking system.

As described above, an affinity function determines a measure of affinity or relevance for a particular action based on a combination of predictor functions for other actions. In particular embodiments, the affinity function computes the requested measure of affinity by combining a weighted set of predictor functions, where each predictor function predicts whether the user will perform a particular action. As an example and not by way of limitation, the weighted predictor functions are summed linearly. As another example, other methods of combining the predictor functions may be used, such as for example harmonic means, mean squares, and geometric means. The weighting of the predictor functions used to calculate the measure of affinity may be provided by the process that requests the measure of affinity. Each process may weight the predictor functions differently to calculate the measure of affinity for a particular action, such that the affinity function is tunable by the process.

Additionally, multiple measures of affinity with varying weights may be computed for use by various processes in the social-networking system environment for different purposes. For example, in a process that provides advertisements with social endorsements from a user's "friends", an advertising algorithm may use the measure of affinity function to determine which of a user's "friends" to mention in the social endorsement or what type of actions to mention in the endorsement. In particular embodiments, the measure of affinity may be used to encourage more user interaction with the social networking system and enhance the user experience. The social-networking system may customize delivery of information to a viewing user executing a particular application on mobile-computing device 200 by employing algorithms to filter the raw content on the network. Content may be filtered based on measures of affinity related to the user's profile, such as geographic location, employer, job type, age, music preferences, interests, or other attributes, or device-related measures of affinity, as described above, or based on the interests of the user with respect to another user who is related to the generated content (e.g., the user who performed an action that resulted in the content or information). Social endorsement information may be used to provide social context for advertisements presented to a particular user when using particular applications executed on mobile-computing device 200 or applications not native to the social-networking system. The measure of affinity may then be based on those predictor functions that indicate a level of interest the user might have in viewing the content posted by another user as well as one or more predictor functions that indicate a level of interest the user has in various actions that may be mentioned in the social endorsement.

As an example and not by way of limitation, an advertising algorithm may provide relatively large weights for these predictor functions so that the resulting measure of affinity would more accurately determine which social endorsements would be more interesting to the user. The advertisement algorithm may select the social endorsement using the resultant measure of affinity, thereby increasing the likelihood of a click-through of the advertisement. As another example, in a process for a social-game application that seeks to invite connections of the user or send messages on behalf of the user, a social algorithm may use the measure of affinity function to determine which of a user's connections to suggest for invitation to the game or what type of messages to send on behalf of the user. The measure of affinity for this purpose may be based on the predictor functions that show how interested the user is in viewing the content posted by the user's connections and/or how often the users plays games with the user's connections in general, as well as one or more predictor functions that show how interested the user is posting different types of messages. Accordingly, the social algorithm would weight these predictor functions relatively high so that the resulting measure of affinity would accurately determine which connection(s) to suggest that the user invite and which invitations or messages would be more interesting to the viewing user, and then select the invitation or message using the resulting measure of affinity. Because of the highly tunable nature of the affinity function, enabled by the weighted predictor functions, it can be used for a number of different purposes.

Figure 5:
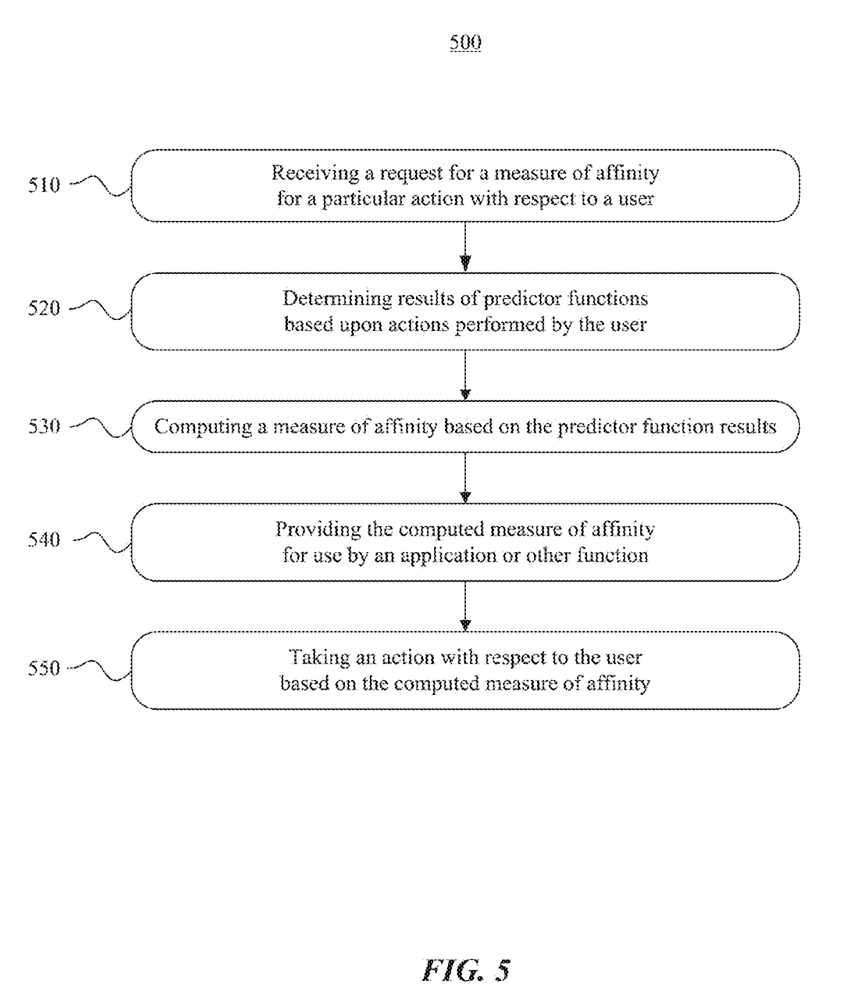
FIG. 5 illustrates an example method for computing a measurement of affinity.

FIG. 5 illustrates an example method 500 for computing a measurement of affinity, as previously discussed above in more detail. The method 500 may start at step 510, where the social-networking system receives a request for a measure of affinity for a particular action associated with a user of the social-networking system. In particular embodiments, the measure of affinity is indicative of relevance of the particular action to the user. At step 520, results for each of one or more predictor functions are determined based at least in part upon actions previously performed by the user with respect to the mobile-computing device. In particular embodiments, each predictor function calculates a likelihood that the user will perform particular actions with respect to the mobile-computing device. At step 530, a measure of affinity is computed in association with the user based on the results for one or more of the predictor functions. In particular embodiments, the measure of affinity is computed using a combination of the results of the predictor functions. At step 540, the computed measure of affinity is provided for use by an application or other function. As previously discussed the measure of affinity may be used for internal functionality of the social-networking system, or it may be provided in some form (e.g., API) to external systems. In particular embodiments, at step 550, the computed measure of affinity is used as a basis for taking some action: for example, determining what content to provide to the user, determining whether the user might have a particular interest, suggesting that the user take some particular action (e.g., joining a group or liking some other web page or profile), selecting an advertisement or notification to be delivered to the user. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
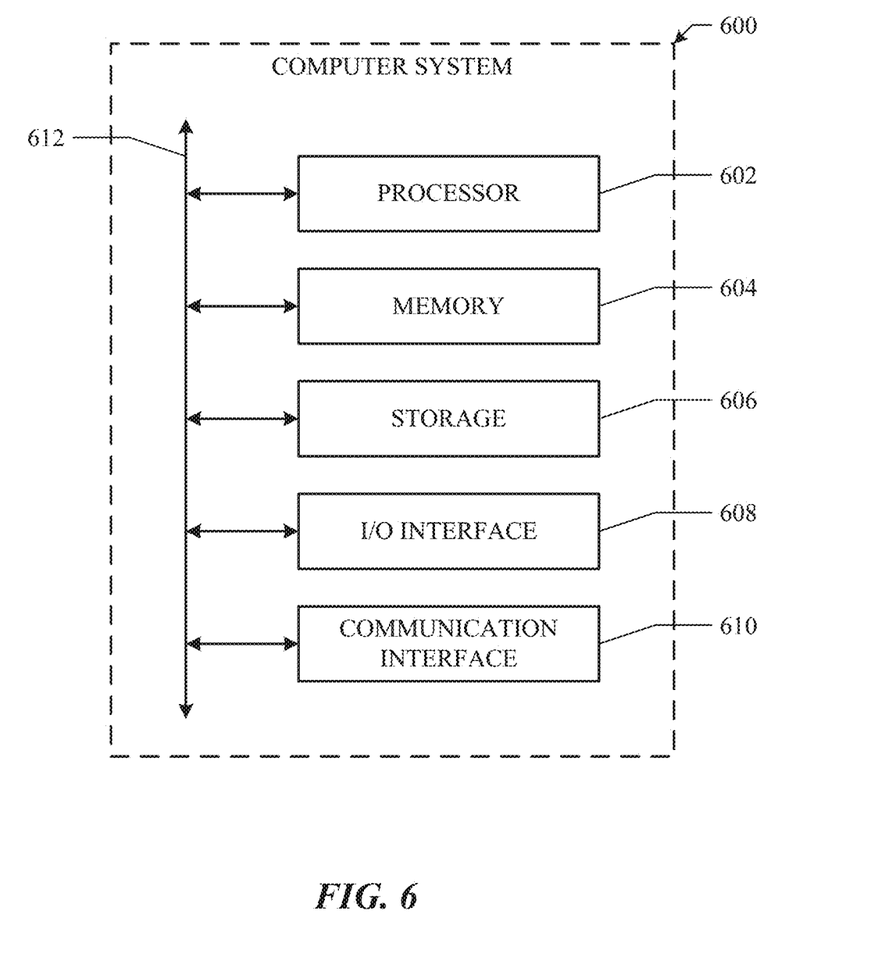
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 700.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple datacenters; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. Although this disclosure describes and illustrates particular memory, this disclosure contemplates any suitable memory.

In particular embodiments, storage 606 includes mass storage for data or instructions. Storage 606 may include removable or non-removable (i.e., fixed) media, where appropriate. Storage 606 may be internal or external to computer system 600, where appropriate. In particular embodiments, storage 606 is non-volatile, solid-state memory. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. Although this disclosure describes and illustrates a particular communication interface, this disclosure contemplates any suitable communication interface.

In particular embodiments, bus 612 includes hardware, software, or both coupling components of computer system 600 to each other. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL (SD) card, a SD drive, or another suitable computer-readable storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices associated with an application:
    sending, to a computer server machine, a request for a first measure of affinity associated with a first user for a particular content, wherein the first measure of affinity predicts a level of interest the first user has for the particular content, and wherein the particular content is shared by a second user on an online social network;
    sending, to the computer server machine, a first weighting information that is to be used in computing the first measure of affinity, wherein the first weighting information comprises information specifying:
        a first weight to be attributed to a first predictor function that is based on an interest of the first user for the second user who shared the particular content on the online social network, and
        a second weight to be attributed to a second predictor function that is based on one or more concepts associated with the particular content;
    sending, to the computer server machine, a second weighting information that is to be used in computing a second measure of affinity, wherein the second weighting information comprises information specifying:
        a third weight to be attributed to a third predictor function, the third predictor function being based on one or more attributes of the first user;
    receiving, by one or more of the computing devices associated with the application, the first measure of affinity;
    receiving, by one or more of the computing devices associated with the application, the second measure of affinity; and
    sending, to the first user, the particular content, based at least in part on the received first measure of affinity and the received second measure of affinity.

2. The method of claim 1, wherein the first weighting information further comprises information specifying a fourth weight to be attributed to a fourth predictor function that is based on one or more attributes of the first user.

3. The method of claim 2, wherein the one or more attributes of the first user comprises a geographic location associated with the first user.

4. The method of claim 1, wherein the first or second measure of affinity is further based on one or more actions taken by the first user with respect to a client system associated with the first user.

5. The method of claim 4, wherein the one or more of the actions taken by the first user with respect to the client system comprises actions using a telephone feature of the client system, accessing content through a network connection, actions using contact information stored on the client system, or actions affecting one or more applications on the client system.

6. The method of claim 1, further comprising determining the first weight and the second weight based on the relative importance of their respective predictor functions to the first measure of affinity with respect to sending the particular content to the first user.

7. The method of claim 1, wherein:
    the first predictor function predicts a level of interest the first user has in viewing content posted by the second user.

8. The method of claim 1, further comprising:
    sending a request for the second measure of affinity; and
    determining one or more weights to be included in the second weighting information.

9. The method of claim 1, wherein the second weighting information further comprises information specifying:
    a fifth weight to be attributed to a fifth predictor function, the fifth predictor function being based on a history of actions performed by the first user on a particular client system associated with the first user; and
    a sixth weight to be attributed to a sixth predictor function, the sixth predictor function predicting a level of interest the first user has for the second user.

10. The method of claim 1, wherein a delivery of the particular content is customized based on the received first measure of affinity and the received second measure of affinity.

11. The method of claim 1, wherein the particular content comprises a social endorsement for a particular item.

12. The method of claim 1, wherein the particular content comprises a request to join a particular application.

13. The method of claim 1, further comprising determining whether to send the particular content based on an algorithm to filter content on an online network.

14. The method of claim 1, wherein the computer server machine is associated with a social-networking system and the first user is a user of the social-networking system.

15. One or more computer-readable non-transitory storage media embodying software that is operable when executed to:
    send a request for a first measure of affinity associated with a first user for a particular content, wherein the first measure of affinity predicts a level of interest the first user has for the particular content, and wherein the particular content is shared by a second user on a social network;
    send a first weighting information that is to be used in computing the first measure of affinity, wherein the first weighting information comprises information specifying:
        a first weight to be attributed to a first predictor function that is based on an interest of the first user for the second user who shared the particular content on the online social network, and a second weight to be attributed to a second predictor function that is based on one or more concepts associated with the particular content;

send a second weighting information that is to be used in computing a second measure of affinity, wherein the second weighting information comprises information specifying:

a third weight to be attributed to a third predictor function, the third predictor function being based on one or more attributes of the first user;

receive the first measure of affinity;

receive the second measure of affinity; and send, to the first user, the particular content, based at least in part on the received first measure of affinity and the received second measure of affinity.

16. The media of claim 15, wherein the software is further operable when executed to:

determine the first weight and the second weight based on the relative importance of their respective predictor functions to the first measure of affinity with respect to sending the particular content to the first user.

17. The media of claim 15, wherein:

the first predictor function predicts a level of interest the first user has in viewing content posted by the second user.

18. The media of claim 15, wherein the first weighting information further comprises information specifying a fourth weight to be attributed to a fourth predictor function that is based on one or more attributes of the first user.

19. The media of claim 15, wherein the software is further operable when executed to:

send a request for the second measure of affinity; and determine one or more weights to be included in the second weighting information.

20. A system comprising:

one or more processors associated with one or more computer servers associated with a social-networking system; and a memory coupled to the processors comprising instructions executable by the processors, the processors operable when executing the instructions to:

send a request for a first measure of affinity associated with a first user for a particular content, wherein the first measure of affinity predicts a level of interest the first user has for the particular content, and wherein the particular content is shared by a second user on an online social network;

send first weighting information that is to be used in computing the first measure of affinity, wherein the first weighting information comprises information specifying:

a first weight to be attributed to a first predictor function that is based on an interest of the first user for the second user who shared the particular content on the online social network, and a second weight to be attributed to a second predictor function that is based on one or more concepts associated with the particular content;

send a second weighting information that is to be used in computing a second measure of affinity, wherein the second weighting information comprises information specifying:

a third weight to be attributed to a third predictor function, the third predictor function being based on one or more attributes of the first user;

receive the first measure of affinity;

receive the second measure of affinity; and send, to the first user, the particular content, based at least in part on the received first measure of affinity and the received second measure of affinity.

* * * * *